Patented Sept. 1, 1953

2,650,917

UNITED STATES PATENT OFFICE 2,650,917

GUM ETHERS AND PROCESS THEREFOR

Owen A. Moe, Minneapolis, Minn., assignor to General Mills, Inc., a corporation of Delaware No Drawing. Application January 4, 1947, Serial No. 720,313

5 Claims. (Cl. 260—209)

The present invention relates to derivatives of glucomannan gums and galactomannan gums, formed by reaction with a polyfunctional etherification reagent.

The types of gums to which the present invention relates are those known as galactomannans and glucomannans, which upon hydrolysis yield mannose and galactose, and mannose and glucose respectively. Typical of the galactomannans are locust bean, guar, tara, flame tree, honey locust, palo verde, and the like. The glucomannans are found chiefly in the corms of the plants of the Amorphophallus species, such as *Amorphophallus rivieri*.

The products of the present invention are those which result from the reaction of the above gums or their water-soluble derivatives with various polyfunctional etherification reagents, preferably bifunctional etherification reagents, such that ether cross-linkages are formed between molecules of the gum to produce larger molecules. Where the gums are employed in their unmodified form, the ethers obtained are usually water insoluble and are useful principally for further syntheses. Where the gums are employed in the form of water-soluble derivatives, the resultant ether derivatives are usually water soluble. Moreover, when water-soluble electrolytes are removed from these water-soluble ether derivatives, the derivatives display phenomenal viscosities in aqueous sols; for example, sols having concentrations as low as ¾% display Brookfield viscosities in the range of 50,000 to 100,000 centipoises.

It is, therefore, an object of the present invention to provide novel ether derivatives of glucomannan and galactomannan type gums with polyfunctional etherification reagents.

It is a further object of the present invention to provide novel water soluble ether derivatives of glucomannan type and galactomannan type gums with polyfunctional etherification reagents.

It is a further object of the invention to provide water soluble ether derivatives of these gums with polyfunctional etherification reagents, the derivatives being substantially free from inorganic water soluble electrolytes such that they are capable of producing high viscosity sols at low concentrations.

These and other objects of the invention will be apparent from the following description of the invention, with particular reference to examples which are to be considered as illustrative only and not as limiting the invention.

As was pointed out above the invention is applicable to any carbohydrate gum which yields mannose and galactose or mannose and glucose on hydrolysis. It is preferred that a suitable water soluble derivative of the gum be employed for reaction with the polyfunctional etherification reagent. Such derivatives as the carboxyalkyl gums described in my copending application, Serial No. 612,717, now Patent No. 2,477,544 filed August 25, 1945, particularly the alkali metal salts of such derivatives may be used. Other water solubilizing groups include the sulfate derivative and its alkali metal salts. Any polyfunctional etherification reagent which will react with the hydroxyl groups may be used. Typical etherification reagents are halo alkyl ethers such as 2-chloroethyl ether, halohydrins such as glycerol dihalohydrin, glycerol epihalohydrin, and the like.

The products of the present invention are made according to the following general procedure. If a water-soluble derivative of the gum is to be employed in the etherification reaction with the polyfunctional etherification reagent, this water-soluble derivative may be prepared as follows: The gum is dispersed in an aqueous solution of caustic alkali at a low temperature and then a suitable solubilizing agent such as chloracetic acid is added. Thereafter the reaction mixture may be heated to complete the reaction. The water-soluble derivative may be recovered from the reaction mixture, for example, by precipitating it by the gradual addition of methanol. The thus recovered sodium carbethoxymethyl ether of the gum may be dissolved in aqueous alkali, after which a suitable etherifying agent, such as those previously mentioned, may be added and the reaction carried on for an extended period of time, for example 4 to 8 hours, at an elevated temperature, for example, 50–85° C. After the reaction is completed, the reaction mixture may be neutralized with dilute acetic acid and the product precipitated by the addition of methanol.

If the gum is used directly in the etherification reaction with the polyfunctional etherification reagent, this may be accomplished by dispersing the gum directly in the aqueous alkali and then adding the polyfunctional etherification reagent as previously described. As was described previously, those ether derivatives which are soluble in the reaction mixture may be precipitated by means of a water-miscible organic solvent such as methanol or acetone to reduce the solubility of the ether derivative. Where the ether derivative is insoluble in water, it will precipitate directly from the reaction mixture and can be isolated.

Usually the products obtained from the reaction mixture display relatively low viscosities in aqueous sols. The viscosity may be approximately the same as that of the untreated gum or derivative. These materials may then be further processed so as to produce a phenomenal increase in viscosity. Several methods have been discovered which will effect a removal of a large part of inorganic soluble electrolytes which appear to adversely affect the viscosity-producing properties of the product. One of these methods involves refluxing with aqueous methanol, for example 80% methanol, and by precipitation of the derivative obtained from the reflux mixture. This purification procedure may be repeated if necessary to remove further quantities of the electrolyte.

*Example 1*

Twenty parts of guar gum (finely powdered) were dispersed in 100 parts of 20% sodium hydroxide solution at 0 to −10° C. The gum dispersed readily in the cold alkaline solution. Then 24 parts of finely ground chloracetic acid were added. After the addition of the chloro acid was complete, the reaction mixture was heated in a hot water bath at 80–85° C. with occasional stirring for a period of one hour. The reaction mixture was diluted by the addition of 50 parts of water and the heating was continued for an additional hour. The reaction mixture was then diluted with 200 parts of water and the reaction product was precipitated by the gradual addition of methanol. The reaction product was dried in methanol, ground, washed with methanol and ether and dried in vacuo.

Ten parts of the above sodium carboxymethyl ether of guar gum were dissolved in 60 parts of 20% aqueous sodium hydroxide solution. The resulting mixture was heated until completely homogeneous. Four and one-half parts of 2-chloroethyl ether were added with vigorous stirring. The resulting reaction mixture was heated at 65–70° C. for a period of 5 hours with only intermittent mixing. The reaction mixture was diluted with 250 parts of water and after standing overnight the reaction mixture was heated with stirring until a clear solution resulted. After neutralization by addition of dilute acetic acid, the product was precipitated with methanol, ground, washed with ether and dried in vacuo. This reaction product did not display the phenomenal viscosity to be described later due to the presence of a considerable quantity of water soluble electrolytes.

The above product was mixed with 250 parts of 80% methanol and the resulting reaction mixture was refluxed for a period of 3 hours. The reflux product was collected by filtration and dried in vacuo. The resulting product which had been subjected to refluxing with 80% methanol showed an enhancement in its ability to form viscous solutions. Two parts of this product were dissolved in 198 parts of water. This aqueous solution was diluted with 100 parts of methanol. The precipitation of the product was then accomplished by the addition of a large excess of acetone. The precipitated product was collected by filtration, washed with methanol and ether, and dried. The product obtained in this manner was substantially free from water soluble electrolytes and a ¾% solution displayed a phenomenal viscosity. Dilution of this extremely viscous solution was continued until 0.2% solution resulted. This 0.2% aqueous solution still displayed an amazing viscosity in spite of the low concentration of the carboxymethyl gum ether-2-chloroethyl ether reaction product.

*Example 2*

Twenty parts of a sodium carboxymethyl ether of guar gum were dissolved in 120 parts of 20% sodium hydroxide solution. The reaction mixture was diluted by 60 parts of water. Nine parts of glycerol dichlorohydrin were added with stirring and the resulting mixture was heated in a water bath. When the temperature had increased to approximately 55° C., the reaction mixture had formed a firm gel. (Heating may be continued for another 20–40 minutes.) Five hundred parts of water were added and the reaction mixture was mixed vigorously. Neutralization was accomplished by the addition of 5 N acetic acid. After standing overnight, the reaction product was precipitated by the addition of methanol, worked up in the usual manner and dried in vacuo. When this sodium carboxymethyl gum ether-glycerol dichlorohydrin reaction product was subjected to the reflux and precipitation procedure described in Example 1, it formed aqueous solutions which displayed very marked enhancement in viscosity.

*Example 3*

Twenty parts of a sodium carboxymethyl ether of guar gum were dissolved in 120 parts of 20% sodium hydroxide solution and an additional portion (60 parts) of water was added. Nine parts of 2-chloroethyl ether were added with stirring and the resulting reaction mixture was heated in a hot water bath at 65–75° C. After a heating period of approximately 4–5 hours, a stiff gel resulted and the heating was usually continued for an additional hour. The resulting reaction mixture was vigorously mixed as 400 parts of water were added. The gradual addition of 5 N acetic acid was continued until the reaction mixture was neutralized. After standing overnight the reaction product was precipitated with methanol, collected and treated in the usual manner. When this reaction product was subjected to the previously outlined procedure, it formed aqueous solutions which displayed very marked enhancement in viscosity.

*Example 4*

Twenty parts of iles mannan flour were dispersed uniformly in 60 parts of 33% aqueous sodium hydroxide solution cooled to 0° C. This alkali-gum mixture was heated in a water bath until a solid, rubber-like mixture resulted. This solid, rigid, yet rubber-like mass was cooled and ground into fine particles. Then 22 parts of chloracetic acid were added with efficient mixing and cooling. After the addition of the etherifying reagent was complete, the resulting reaction mixture was heated in a water bath at 80° C. for a period of 90 minutes. The mixture was made acidic to phenolphthalein, cooled and diluted with 300 parts of water. The reaction mixture was dark colored and the reaction product was precipitated by the addition of methanol which removed nearly all of the color. The precipitated product was worked up and dried in a normal manner.

Ten parts of the above prepared carboxymethyl iles mannan gum ether were mixed with 60 parts of a 20% aqueous sodium hydroxide solution.

The resulting reaction mixture was heated in a water bath and an additional portion of water (60 parts) was added during the heating period. After complete solution, 6 parts of 2-chloroethyl ether were added and the resulting reaction mixture was heated at 70° C. for a period of 75 minutes, when a stiff gel resulted. An additional portion (4 parts) of 2-chloroethyl ether was added and the heating period was continued for an additional hour. The reaction product was precipitated by the addition of methanol. The precipitated product was allowed to stand in fresh methanol for approximately 16 hours, when it was collected by filtration and dried in vacuo. This carboxymethyl gum ether-2-chloroethyl ether reaction product was readily dispersible in cold water to yield solutions of moderate viscosity.

*Example 5*

Twenty-five parts of locust bean gum (finely powdered) were mixed with 150 parts of 20% aqueous sodium hydroxide solution. The resulting alkaline mixture was heated in a water bath and an additional portion (110 parts) of water was added during the heating period. When the reaction mixture appeared to be substantially uniform, 15 parts of 2-chloroethyl ether were added with efficient mixing and the resulting reaction mixture was heated for a period of 105 minutes, when a very rigid gel resulted. The product was precipitated by the addition of methanol. The precipitated product was allowed to stand in fresh methanol overnight. The product was then collected by filtration, washed with methanol and dried in vacuo. This locust bean gum-2-chloroethyl ether reaction product was not dispersible in water. However, it swelled appreciably on prolonged standing with water.

Reactions of this type may be carried out employing other *Cassia occidentalis* gums of these types such as locust bean, honey locust, flame tree, tara, and the like, with comparable results.

Numerous embodiments of the invention not specifically referred to above will be apparent from the description, and likewise numerous variations are possible in the method of producing these products. Amounts and concentrations of reagents may be varied within considerable limits. These may affect the extent to which the reaction is carried and the resultant product will vary in properties depending upon the particular reaction conditions. It will be apparent, therefore, that a wide variety of products may be made by varying these factors. Other variables include temperature, time, and the like.

Some of the polyfunctional reagents are more reactive than others as is well understood in the art. The reaction conditions as temperature, time and concentration may be varied depending upon the particular reactivity of the polyfunctional reagent. It will be apparent, therefore, that numerous variations are possible from the specific examples set forth, and that the invention is not limited to these specific examples but may be varied within the scope of the following claims.

I claim as my invention:

1. An ether of a water-soluble derivative of a gum selected from the group consisting of galactomannans and glucomannans, said ether being the reaction product of said derivative and an etherification agent containing a plurality of etherifying groups, and said ether being characterized by being substantially free from water-soluble electrolytes and capable of producing a ¾% aqueous solution having a Brookfield viscosity not substantially less than 50,000 centipoises.

2. Product according to claim 1 in which the water-solubilizing group is an alkali metal carboxyalkyl ether group.

3. Product according to claim 1 in which the etherifying agent is 2-chlorethyl ether.

4. Product according to claim 1 in which the etherifying agent is glycerol dichlorhydrin.

5. Process of improving the viscosity characteristics of dilute aqueous solutions of an ether of a water-soluble derivative of a gum selected from the group consisting of galactomannans and glucomannans, said ether being the reaction product of said water-soluble derivative and an etherification agent containing a plurality of etherifying groups, which comprises dissolving said ether containing water-soluble electrolytes in an aqueous solution, precipitating the ether derivative from the aqueous solution, refluxing the precipitated ether derivative with methanol, dissolving the refluxed product in water and precipitating the derivative by means of methanol.

OWEN A. MOE.

References Cited in the file of this patent

UNITED STATES PATENTS

| Number | Name | Date |
|---|---|---|
| 2,148,951 | Maxwell | Feb. 28, 1939 |
| 2,190,179 | Ziese et al. | Feb. 13, 1940 |

OTHER REFERENCES

Paper Trade Journal, V. 121 (Dec. 20, 1945), pp. 38, 40.